United States Patent Office 2,780,802
Patented Feb. 5, 1957

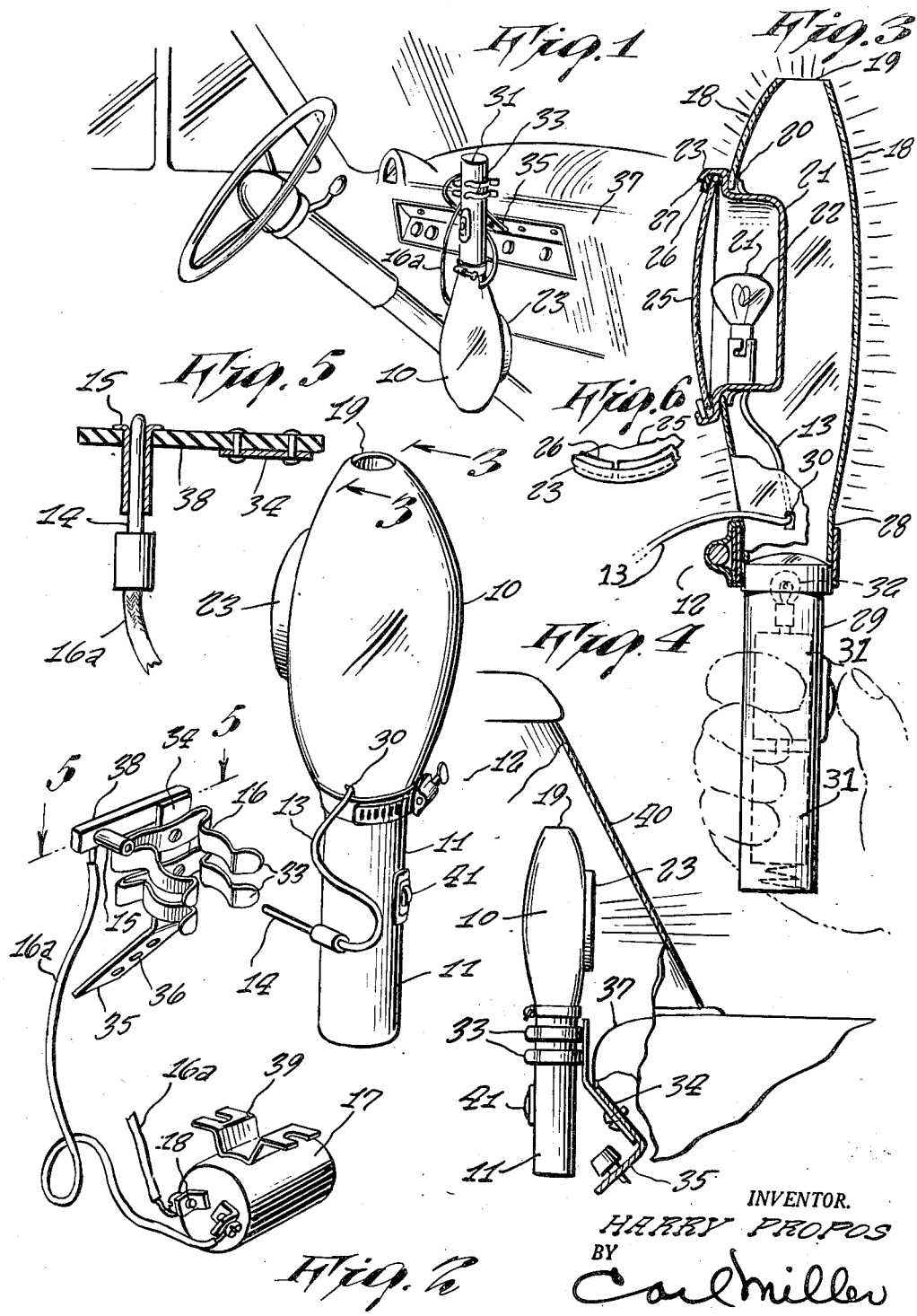

2,780,802

PORTABLE SELF CONTAINED SIGNAL AND WARNING LIGHT

Harry Propos, Teaneck, N. J.

Application November 12, 1954, Serial No. 468,238

3 Claims. (Cl. 340—321)

This invention relates to an emergency light having a plurality of functions, particularly in relation to vehicles and vehicular traffic.

Numerous situations arise in the normal usage of vehicles which call for the immediate availability of an illuminating light beacon and/or colored signal lights.

Consequently, it is the primary object of this invention to provide a portable emergency light especially adapted for use in a vehicle which is capable of emitting a flashing colored signal, a steady colored glowing signal, a steady white illuminating beacon or a combination thereof.

A more specific object of this invention is the provision of an emergency light of the class recited in the preceding object, which can be removably mounted on the dashboard of a vehicle and which utilizes the current from the vehicle storage battery.

Another specific inventive object involves the provision of an emergency light alternately usable either in a vehicle wherein the vehicle storage battery can be used as a current source or as a portable signal light incorporating its own source of power.

A further specific inventive object is the provision of an emergency light which can be mounted on the dashboard of a vehicle in a fashion which permits the user to displace the light from the dashboard to other desired locations in or about the vehicle, or to affix the light to the dashboard in either an operative or inoperative position, and which further can be used completely detached from the automobile, as a traffic baton.

A still further inventive object is the provision of an emergency illuminating or warning signal light which includes a bracket for removable dashboard mounting, having an electrical outlet connected to a vehicle storage battery.

Further objects and inventive details will become apparent from the following detailed description, when read in conjunction with the annexed drawings in which:

Figure 1 is a perspective view of the invention shown operatively mounted in a vehicle.

Figure 2 is a perspective view of the device removed from the vehicle.

Figure 3 is a longitudinal section through plane 3—3 of Figure 2.

Figure 4 is a side view of the light in operation on a dashboard.

Figure 5 is a sectional view through 5—5 of Figure 2.

Figure 6 is a partial front view showing the retaining ring for the flashing light.

Referring to Figure 2, the device is seen to comprise the signal head 10 removably mounted on a flashlight 11 by means of a worm gear clamping band 12. An electric lead 13 projects from the head 10 and terminates in a male plug 14 which is inserted in a female plug 15 mounted on a dashboard bracket 16. A lead 16a connected to the female plug 15 on one end, is electrically connected to a circuit breaker flashing unit 17 at the other end. The terminal 18 of the unit 17 can be connected to a storage battery or other current source (not shown) when the signal light 22 is to be operated. There is also provided within the head 10 a second wire (not shown) operatively connected to the lighting means in the head 10 on one end, and grounded on the other end, thereby completing the circuit.

The head 10 is better seen in Figure 3 to comprise the oval shaped translucent lamp 18 having the end perforation 19 and the circular lateral opening 20. Such materials as vinyl plastic, glass, or other suitably translucent materials can be used to fabricate the lamp 18, although a plastic material is preferred. For signalling purposes, the lamp is preferably colored red, obviously other colors can be substituted, if desired.

Mounted in the opening 20 is an aluminum housing 21, in which is mounted a signal light 22. The housing 21 comprises an outer flange 23 which is U-shaped and abuts the exterior of the lamp 18 along the annular edge 24. A colored translucent window 25 is retained within the flange 23 by means of the expanding split ring 26 fitted between the outer leg 27 and the window 25. The housing 21 is further secured to the lamp 18 by means of screws or the like.

The base of the lamp 18 is in the form of a cylindrical neck 28 dimensioned to receive snugly the head of a flashlight 29. By means of the said worm clamp 12, the lamp neck 28 is removably fastened to the head 29. Adjacent the neck 28 a hole 30 is provided for the lead line 13.

As is conventional, the flashlight casing houses the batteries 31 and the light bulb 32.

Referring again to Figure 2, the bracket 16 is seen to comprise the snap clamps 33 attached by screws to the angle bracket 34. The lower leg 35 of the said bracket is provided with the holes 36 which receive screws for mounting the bracket on the dashboard 37 (see Figure 1). An insulated arm 38 extends normally from the bracket 34 and carries the female plug 15 and the lead 16a. Such insulating materials as fibrebar, plastic, Bakelite etc. can be used to fabricate the support arm 38. As also seen in Figure 2, the flashing unit 17 is also provided with a mounting bracket 39, whereby the unit can be secured at any desirable location in the vehicle.

In Figure 5, the method for mounting the plug 15 and the bracket 34 are better seen.

When the device is used in connection with a vehicle, the bracket assembly 16 is mounted in a conventional position on the dashboard, and the wire leads are connected to the vehicle storage battery circuit. If there is no need to use the light, the unit is suspended in the clamps 33 with the lamp towards the floor. Should a need arise for the emission of a signal or an illuminating beacon, the device is inverted so that the lamp is closer to the vehicle ceiling, as seen in Figure 4. When so positioned, the lamp is adjacent the windshield, whereby light generated in the lamp is transmitted to the vehicle exterior via the windshield 40.

If only a glowing steady light is desired, the flashlight bulb 32 is energized by the switch 41. If however a flashing signal is desired, the plug 14 is inserted into the plug 15 energizing thereby the unit 17 and the light 22, whose rays are restricted through the window 25. Furthermore, for illuminating purposes the user can remove the device from the clamps 33 and energize only the flashlight bulb 32 while directing the rays therefrom through the aperture 19 at the top of the lamp. Since the white light generated does not pass through a colored or translucent media, a light beam useful for illumination is obtained.

By providing sufficient electric lead wire, the flashing signal can be moved to various car locations or even to positions near the car location.

Due to the flashlight batteries 31, a glowing steady signal can be obtained at any location without requiring an external current source.

Thus, a traffic policeman can utilize the device to direct traffic, or the full three-way device can be utilized in a police or detective car for the various purposes recited above.

Obviously, the uses of the instant device are not limited to the above environments, cited above as examples.

Furthermore, although the embodiment disclosed herein is a preferred form, the many modifications resulting from changes in size, shape, material and rearrangements are all within the inventive scope.

Having thus disclosed the nature of the invention, what is claimed as new and novel is as follows:

1. A dual effect signal lamp of the character described, including an elongated hollow translucent lamp head having a handle at one end for supporting said lamp head, and an opening at the other end, a lamp bulb disposed in effective position at said one end to radiate its light rays to the interior of the lamp head and through said opening at said other end having a current source self-contained within said handle, a second lamp bulb located within the outline of the lamp head facing in a direction perpendicular to the longitudinal axis of said housing and having a separate current source, and means for isolating the light rays of the second light bulb from the interior of said lamp head and directing them outward therefrom, said means comprising an opaque housing extending through a side wall of said head partially into the interior thereof adjacent to said longitudinal axis and intermediate said opening and said lamp bulb at said one end, said housing being transparent in a direction perpendicular to said longitudinal axis of said housing.

2. A dual effect signal lamp according to claim 1, wherein the lamp head is made of colored translucent material and is of elongated convex form with the second lamp bulb located in the side thereof and visible from said side independently of the internal illumination of said lamp head.

3. A dual effect signal lamp according to claim 2, wherein the second lamp bulb has an isolating casing extending into the side of the lamp head and has electrical conductor means leading into the casing through a portion of the lamp head and out through the latter, and wherein the lamp head has an open end remote from but in line with the handle and the end of said lamp head connected thereto.

References Cited in the file of this patent

UNITED STATES PATENTS

| | | |
|---|---|---|
| 1,285,669 | French | Nov. 26, 1918 |
| 1,541,348 | Goodwin | June 2, 1925 |
| 1,634,014 | Brafman | June 28, 1927 |
| 1,981,302 | Bobroff | Nov. 20, 1934 |
| 2,557,859 | Bernstein | June 19, 1951 |
| 2,589,747 | Tedeschi | Mar. 18, 1952 |
| 2,620,388 | Franz | Dec. 2, 1952 |
| 2,641,752 | Naymik | June 9, 1953 |